United States Patent
Mobley et al.

(10) Patent No.: US 11,612,854 B2
(45) Date of Patent: Mar. 28, 2023

(54) NON-AQUEOUS SOLVENT $CO_2$ CAPTURE IN ROTATING PACKED BED

(71) Applicant: Research Triangle Institute, Research Triangle Park, NC (US)

(72) Inventors: Paul David Mobley, Raleigh, NC (US); Marty Lail, Raleigh, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 17/357,319

(22) Filed: Jun. 24, 2021

(65) Prior Publication Data

US 2022/0410063 A1 Dec. 29, 2022

(51) Int. Cl.
*B01D 53/14* (2006.01)
*B01D 53/18* (2006.01)

(52) U.S. Cl.
CPC ..... *B01D 53/1493* (2013.01); *B01D 53/1425* (2013.01); *B01D 53/1475* (2013.01); *B01D 53/18* (2013.01); *B01D 2252/2026* (2013.01); *B01D 2252/20405* (2013.01); *B01D 2252/20426* (2013.01); *B01D 2252/504* (2013.01); *B01D 2258/0283* (2013.01)

(58) Field of Classification Search
CPC ............ B01D 53/1493; B01D 53/1425; B01D 53/1475; B01D 53/18; B01D 2252/2026; B01D 2252/20405; B01D 2252/20426; B01D 2252/504; B01D 2258/0283
USPC ......................................................... 423/228
See application file for complete search history.

(56) References Cited

U.S. PATENT DOCUMENTS

| | | | |
|---|---|---|---|
| 8,679,232 B2 | 3/2014 | Wolf et al. | |
| 9,216,377 B1 | 12/2015 | Mello et al. | |
| 10,413,862 B2 | 9/2019 | Yu et al. | |
| 10,549,233 B2 | 2/2020 | Lail et al. | |
| 10,549,260 B2 | 2/2020 | Tan et al. | |
| 2011/0131937 A1* | 6/2011 | Ming ................. | B01D 53/1475 55/474 |
| 2011/0176981 A1 | 7/2011 | Jacquin et al. | |
| 2017/0050140 A1* | 2/2017 | Coleman ............ | B01D 53/1493 |

(Continued)

FOREIGN PATENT DOCUMENTS

CN 106334412 A 1/2017

OTHER PUBLICATIONS

Cheng-Hsiu Yu, Tsai-Wei Wu, Chung-Sung Tan, "CO2 capture by piperazine mixed with non-aqueous solvent diethylene glycol in a rotating packed bed", International Journal of Greenhouse Gas Control 19 (2013) 503-509. (Year: 2013).*

(Continued)

*Primary Examiner* — Anita Nassiri-Motlagh
(74) *Attorney, Agent, or Firm* — Womble Bond Dickinson (US) LLP

(57) ABSTRACT

The disclosure provides an apparatus, as well as associated systems and methods for removing acid gas components from gas streams. The disclosure provides a rotating packed bed (RPB)-based absorber with a non-aqueous liquid solvent contained therein for treatment of the gas streams, wherein the non-aqueous liquid solvent captures acid components from the gas stream. Various advantages, e.g., with respect to spatial considerations and associated expenses can be realized using the apparatus, systems, and methods described herein.

16 Claims, 5 Drawing Sheets

(56) References Cited

U.S. PATENT DOCUMENTS

| | | | |
|---|---|---|---|
| 2017/0173517 A1 | 6/2017 | Wong et al. | |
| 2018/0318753 A1* | 11/2018 | Yu .......................... | B01D 53/18 |
| 2019/0388836 A1 | 12/2019 | Bumb et al. | |
| 2020/0261846 A1 | 8/2020 | Mobley et al. | |
| 2020/0289976 A1 | 9/2020 | Strand et al. | |
| 2021/0138391 A1 | 5/2021 | Bumb et al. | |

OTHER PUBLICATIONS

Oko et al., "Study of intercooling for rotating packed bed absorbers in intensified solvent-based CO2 capture process", Applied Energy, 223 (2018) 302-316. (Year: 2018).*

Zhang et al., "Absorption of Carbon Dioxide with Ionic Liquid in a Rotating Packed Bed Contactor: Mass Transfer Study", Industrial & Engineering Chemistry Research, 2011, 50, 6957-6964. (Year: 2011).*

Zhang et al., Efficient Capture of Carbon Dioxide with Novel Mass-Transfer Intensification Device Using Ionic Liquids, AIChE Journal, Aug. 2013, Vo. 59, No. 8, pp. 2957-2965. (Year: 2013).*

Sahoo et al., "Amino-Acid-Based Ionic Liquids for the Improvement in Stability and Activity of Cytochrome c: A Combined Experimanetal and Molecular Dynamics Study", J. Phys. Chem. B 2019, 123, 10100-10109. (Year: 2019).*

Yu et al., "CO2 Capture by Aqueous Solution Containing Mixed Alkanolamines and Diethylene Glycol in a Rotating Packed Bed" *Energy Procedia*, 2014, vol. 63, pp. 758-764.

Zhou "Lessons Learned Developing Non-Aqueous Solvent CO2 Capture Process for Coal-Fired Power Plants in Collaboration with SINTEFF: RTFs Experience" *Presentation, RTI International*, May 2018, 20 pages.

Rayer et al., "Absorption Rates of Carbon Dioxide in Amines in Hydrophilic and Hydrophobic Solvents" *Chemical Engineering Journal*, vol. 348, 2018, pp. 514-525.

Atuman et al., "Modelling, Simulation and Analysis of Intensified Regenerator for Solvent Based Carbon Capture Using Rotating Packed Bed Technology," 2017, vol. 201, pp. 1-35.

Chiang et al., "Carbon Dioxide Capture by Sodium Hydroxide-Glycerol Aqueous Solution in a Rotating Packed Bed," *Journal of the Taiwan Institute of Chemical Engineers*, 2017, vol. 72, pp. 29-36.

Yu et al., "CO2 Capture by Piperazine Mixed with Non-Aqueous Solvent Diethylene glycol in a Rotating Packed Bed" *International Journal of Greenhouse Gas Control*, 2013, vol. 19, pp. 503-509.

Zhang et al., "Improvement of Lipophilic-Amine-Based Thermomorphic Biphasic Solvent for Energy-Efficient Carbon Capture," *Energy Procedia*, 2012, vol. 23, No. 1, pp. 92-101.

\* cited by examiner

NON-AQUEOUS SOLVENT CO$_2$ CAPTURE IN ROTATING PACKED BED

FIELD OF THE DISCLOSURE

The present invention relates to systems for the removal of specific components of gas streams, as well as methods of using such systems. More specifically, the invention can provide for removal of acid gases, such as CO$_2$, SO$_2$, COS, CS$_2$ and NOx.

BACKGROUND

Combustion of fossil fuels such as coal, oil, and natural gas is expected to remain the major global energy source for years to come. Currently, 65% of the world's greenhouse gas emissions stem from fossil fuel-fired power plants, whose usage is anticipated to increase by as much as 28% by 2040 from vast growth in emerging markets including China and India. The environmental impact of anthropogenic carbon dioxide (CO$_2$) emissions has prompted a world-wide effort to reduce CO$_2$ atmospheric release. Carbon capture and sequestration (CCS) technologies have advanced over the last decade to become one of the most promising solutions to reduce CO$_2$ (and other acid gas) emissions.

The most advanced carbon capture and sequestration technology to-date is amine-based solvent scrubbing. Solvent-based CO$_2$ capture systems have high CO$_2$ capacities, reversible reactivities with CO$_2$, low heat requirements for absorption and regeneration, and can be composed of aqueous or non-aqueous components. The monoethanolamine (MEA) solvent process has been the most rigorously studied CCS system, and has become the first commercial-scale demonstrated CCS process by SaskPower's Boundary Dam power plant in Saskatchewan, Canada, capturing up to 1.3 million tons of CO$_2$ per year.

Such types of treatment systems are typically associated with high capital and operating expenses that have constrained their widespread implementation, and most research in the past decade has focused on reducing energy requirements for regeneration of capture solvents utilized for CO$_2$ removal to ameliorate these deficiencies. With increasing regulations on CO$_2$ emissions and the desire to decrease the costs of CO$_2$ removal via CCS technologies, it would be advantageous to provide alternative systems for treatment of CO$_2$-containing gases to reduce atmospheric release of CO$_2$.

BRIEF SUMMARY

The present disclosure provides an apparatus and associated system for the removal of acidic gases, such as CO$_2$, from a gas stream and methods for removing acidic gases using such an apparatus or system.

In one aspect of the disclosure is provided an apparatus for removal of one or more acid gas components from a gas stream, comprising a rotating packed bed (RPB) arranged on a rotatable shaft, the RPB comprising: a gas inlet through which an influent gas can enter for gas-liquid contact; a gas outlet through which an effluent gas can exit following the gas-liquid contact; a liquid inlet through which a liquid can enter for the gas-liquid contact; a liquid outlet through which the liquid can exit following the gas-liquid contact; a conduit between the liquid inlet and the liquid outlet, the conduit comprising a non-aqueous liquid solvent for the gas-liquid contact contained therein, wherein the non-aqueous liquid contains about 18% water or less by weight.

The features of the non-aqueous solvent can vary. In one embodiment, the non-aqueous liquid solvent is a solvent for acid gas removal from a flue gas stream. In one embodiment, the non-aqueous liquid solvent has a solubility with water of less than about 25 g of water per 100 g of the non-aqueous liquid solvent. In further embodiments, the non-aqueous liquid solvent contains about 15% water or less by weight, 12% water or less by weight, 10% water or less by weight, or less than 10% water by weight. In some embodiments, the non-aqueous solvent has a kGa value of about 4 or greater, about 4.25 or greater, or about 4.5 or greater (e.g., including, but not limited to, about 4 to about 7 or about 4.5 to about 7), e.g., for an L/G ratio above 0.45 kg/kg.

In one embodiment, the non-aqueous liquid solvent comprises a physical absorbent and a chemical absorbent. For example, in certain embodiments, the non-aqueous liquid solvent comprises one or more hydrophobic primary or secondary amines. In certain embodiments, the non-aqueous liquid solvent comprises one or more diluents selected from the group consisting of optionally substituted alcohols, optionally substituted phenols, optionally substituted nitrogen heterocycles, optionally substituted aliphatic hydrocarbons, optionally substituted ketones, optionally substituted aliphatic ethers, optionally substituted cyclic ethers, optionally substituted oxygen heterocycles, optionally substituted nitrogen heterocycles, optionally substituted esters, optionally substituted amides, and mixtures thereof. In one embodiment, the non-aqueous liquid solvent comprises a hydrophobic primary or secondary amine and a diluent comprising an optionally substituted aliphatic ether. In a further embodiment, the non-aqueous liquid solvent comprises an ionic liquid.

The features of the RPB can vary. Various RPB configurations are known and can be employed according to various embodiments of the present disclosure. The temperature and/or pressure within the RPB can, in some embodiments, be controlled. In one embodiment, the RPB is equipped with a cooling mechanism (e.g., intercooling or between stages of the RPB) and/or a heating mechanism. In some embodiments, a second RPB is in fluid communication with the RPB, e.g., such that the cooling mechanism is between the RPB and second RPB.

The disclosure further provides a system for the removal of one or more acid gas components from a gas stream, comprising an apparatus as provided herein. In one embodiment, the system further comprises a regenerator in fluid communication with the liquid outlet. The regenerator can, in some embodiments, comprise a second RPB.

In another aspect of the disclosure is provided a method for treating a gas stream to remove one or more acid gas components therefrom, comprising passing the gas stream into the gas inlet of an apparatus or system as described herein. The source and composition of the gas stream can vary. In one embodiment, the gas stream is a flue gas stream. The acid gas component in some embodiments comprises one or more of carbon dioxide (CO$_2$), carbonyl sulfide (COS), carbon disulfide (CS$_2$), and sulfur oxides (SO$_x$, e.g., SO$_2$). In some embodiments, the acid gas component specifically comprises CO$_2$. In some embodiments, the method further comprises regenerating the non-aqueous liquid solvent to remove the acid gas components therefrom.

The disclosure also provides a method of reducing capital and operating expenses associated with a system designed for capture of acid gas components from a gas stream, comprising employing an apparatus as described herein within the system in place of a conventional absorber apparatus.

The present disclosure includes, without limitation, the following embodiments.

Embodiment 1: an apparatus for removal of one or more acid gas components from a gas stream, comprising a rotating packed bed (RPB) arranged on a rotatable shaft, the RPB comprising: a gas inlet through which an influent gas can enter for gas-liquid contact; a gas outlet through which an effluent gas can exit following the gas-liquid contact; a liquid inlet through which a liquid can enter for the gas-liquid contact; a liquid outlet through which the liquid can exit following the gas-liquid contact; and a conduit between the liquid inlet and the liquid outlet, the conduit comprising a non-aqueous liquid solvent for the gas-liquid contact contained therein, wherein the non-aqueous liquid solvent contains about 18% water or less by weight.

Embodiment 2: The apparatus of Embodiment 1, wherein the non-aqueous liquid solvent is a solvent for acid gas removal from a flue gas stream.

Embodiment 3: The apparatus of any of Embodiments 1-2, wherein the non-aqueous liquid solvent has a solubility with water of less than about 25 g of water per 100 g of the non-aqueous liquid solvent.

Embodiment 4: The apparatus of any of Embodiments 1-3, wherein the non-aqueous liquid solvent contains less than 15% water by weight or less than 10% water by weight.

Embodiment 5: The apparatus of any of Embodiments 1-4, wherein the non-aqueous liquid solvent has a kGa value of about 4.5 or greater for an L/G ratio above 0.45 kg/kg.

Embodiment 6: The apparatus of any of Embodiments 1-5, wherein the non-aqueous liquid solvent comprises a physical absorbent and a chemical absorbent.

Embodiment 7: The apparatus of any of Embodiments 1-6, wherein the non-aqueous liquid solvent comprises one or more hydrophobic primary or secondary amines.

Embodiment 8: The apparatus of any of Embodiments 1-7, wherein the non-aqueous liquid solvent comprises one or more diluents selected from the group consisting of optionally substituted alcohols, optionally substituted phenols, optionally substituted nitrogen heterocycles, optionally substituted aliphatic hydrocarbons, optionally substituted ketones, optionally substituted aliphatic ethers, optionally substituted cyclic ethers, optionally substituted oxygen heterocycles, optionally substituted esters, optionally substituted amides, and mixtures thereof.

Embodiment 9: The apparatus of any of Embodiments 1-8, wherein the non-aqueous liquid solvent comprises a hydrophobic primary or secondary amine and a diluent comprising an optionally substituted aliphatic ether.

Embodiment 10: The apparatus of any of Embodiments 1-9, wherein the non-aqueous liquid solvent comprises an ionic liquid.

Embodiment 11: The apparatus of any of Embodiments 1-10, wherein the RPB is equipped with a cooling mechanism.

Embodiment 12: The apparatus of any of Embodiments 1-11, further comprising a second RPB.

Embodiment 13: A system for the removal of one or more acid gas components from a gas stream, comprising the apparatus of any of Embodiments 1-12.

Embodiment 14: The system of Embodiment 13, further comprising a regenerator in fluid communication with the liquid outlet.

Embodiment 15: The system of any of Embodiments 13-14, wherein the regenerator comprises a second RPB.

Embodiment 16: The system of any of Embodiments 13-15, comprising one or more (e.g., one two, three, four, or more) additional RPBs.

Embodiment 17: A method for treating a gas stream to remove one or more acid gas components therefrom, comprising passing the gas stream into the gas inlet of the apparatus of any of Embodiments 1-12 or the system of any of Embodiments 13-16.

Embodiment 18: The method of Embodiment 17, wherein the gas stream is a flue gas stream.

Embodiment 19: The method of any of Embodiments 17-18, wherein the one or more acid gas components comprises $CO_2$.

Embodiment 20: The method of any of Embodiments 17-19, further comprising regenerating the non-aqueous liquid solvent to remove the acid gas components therefrom.

Embodiment 21: A method of reducing capital and operating expenses associated with a system designed for capture of acid gas components from a gas stream, comprising employing the apparatus of any of Embodiments 1-12 within the system in place of a conventional absorber apparatus.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

Figure 1:
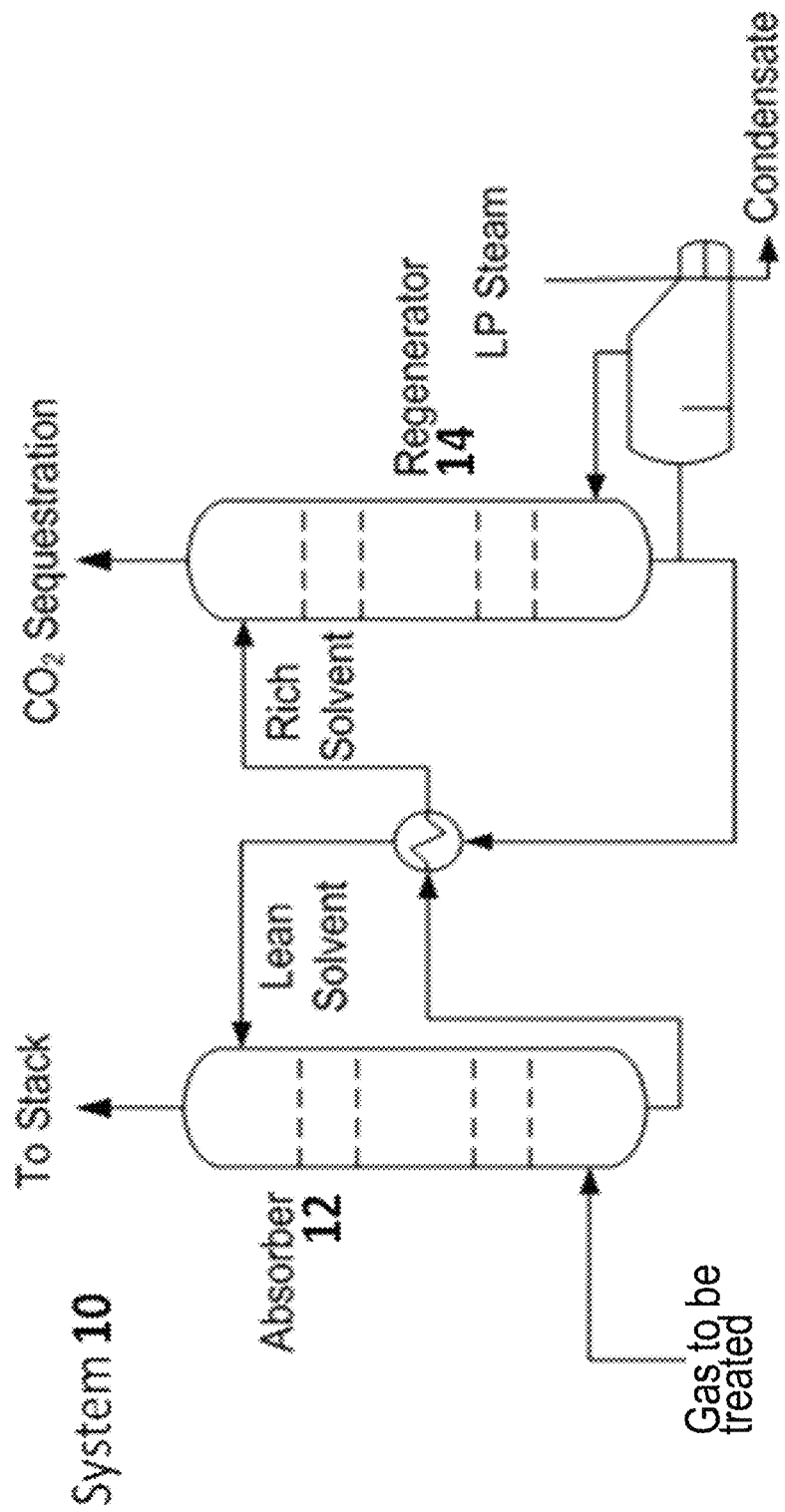
Figure 2:
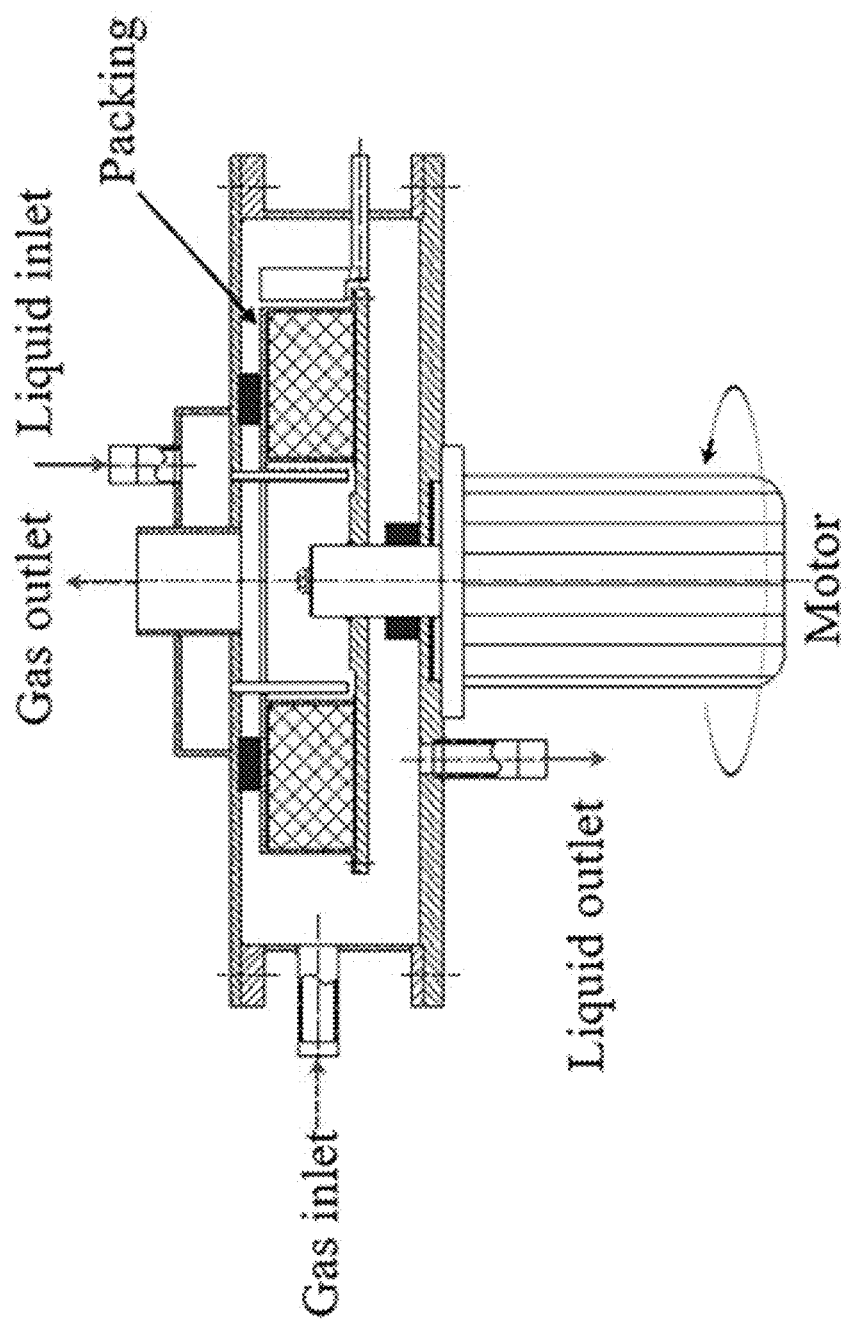
Figure 3:
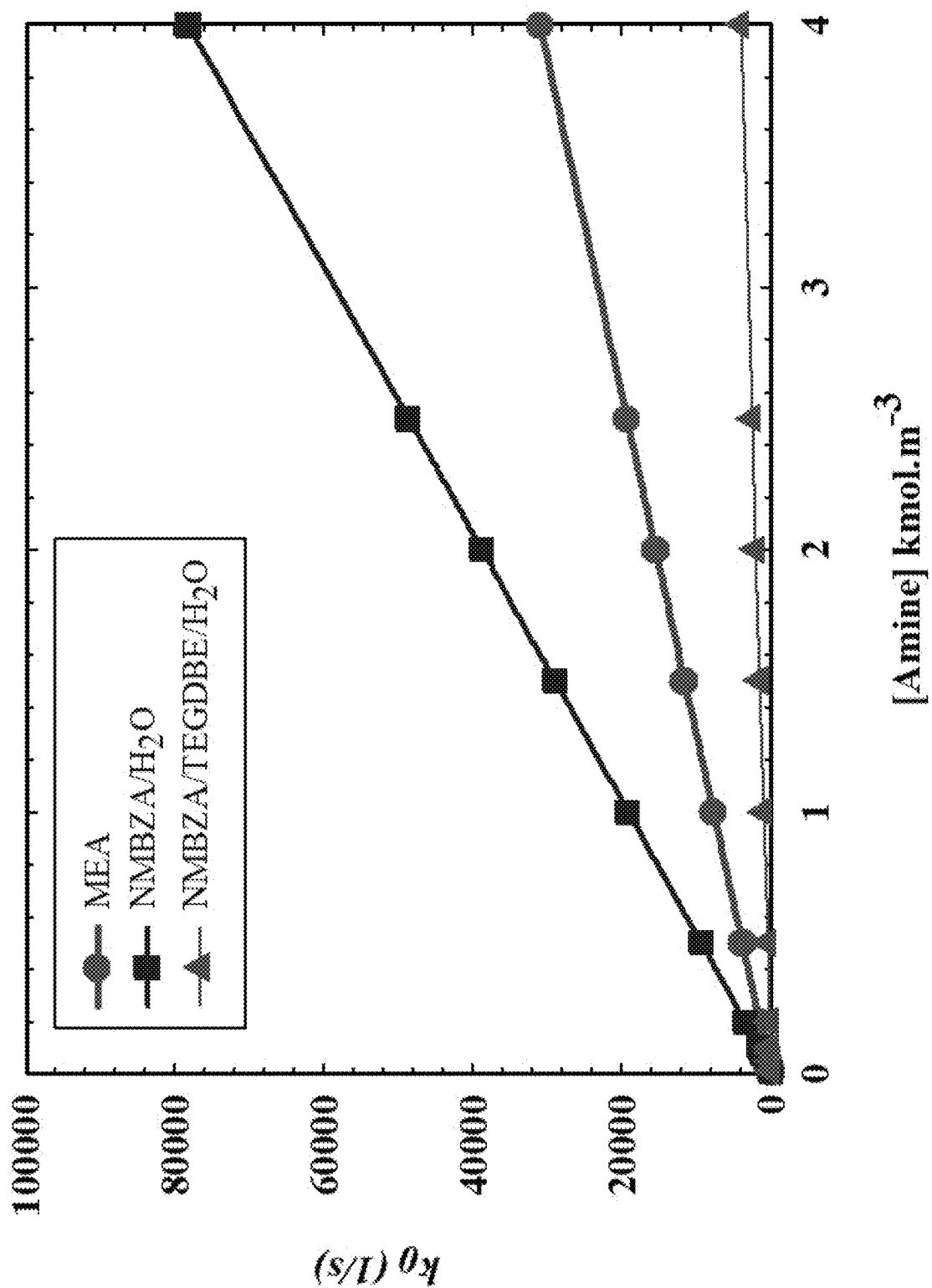
Figure 4:
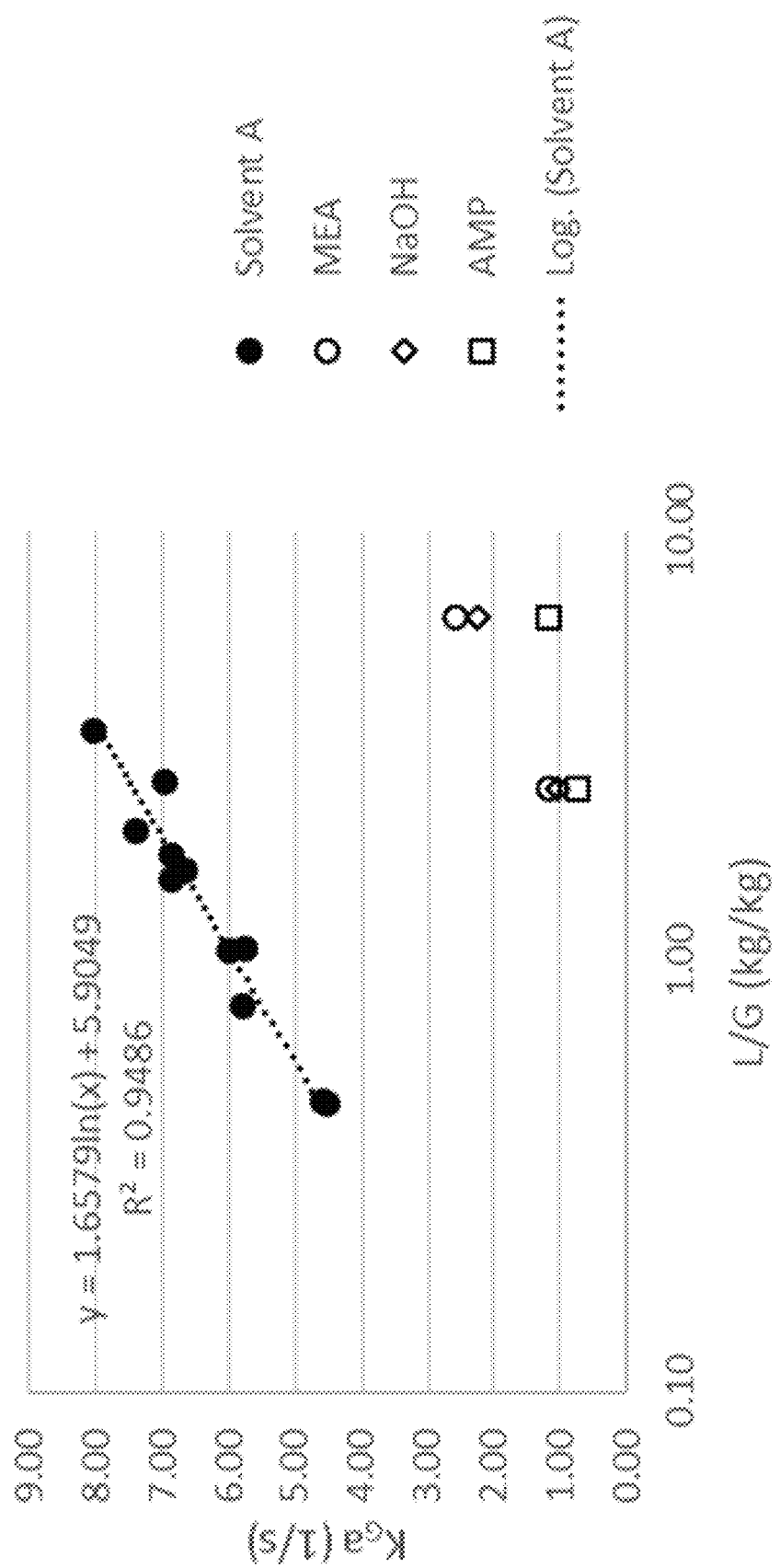
Figure 5:
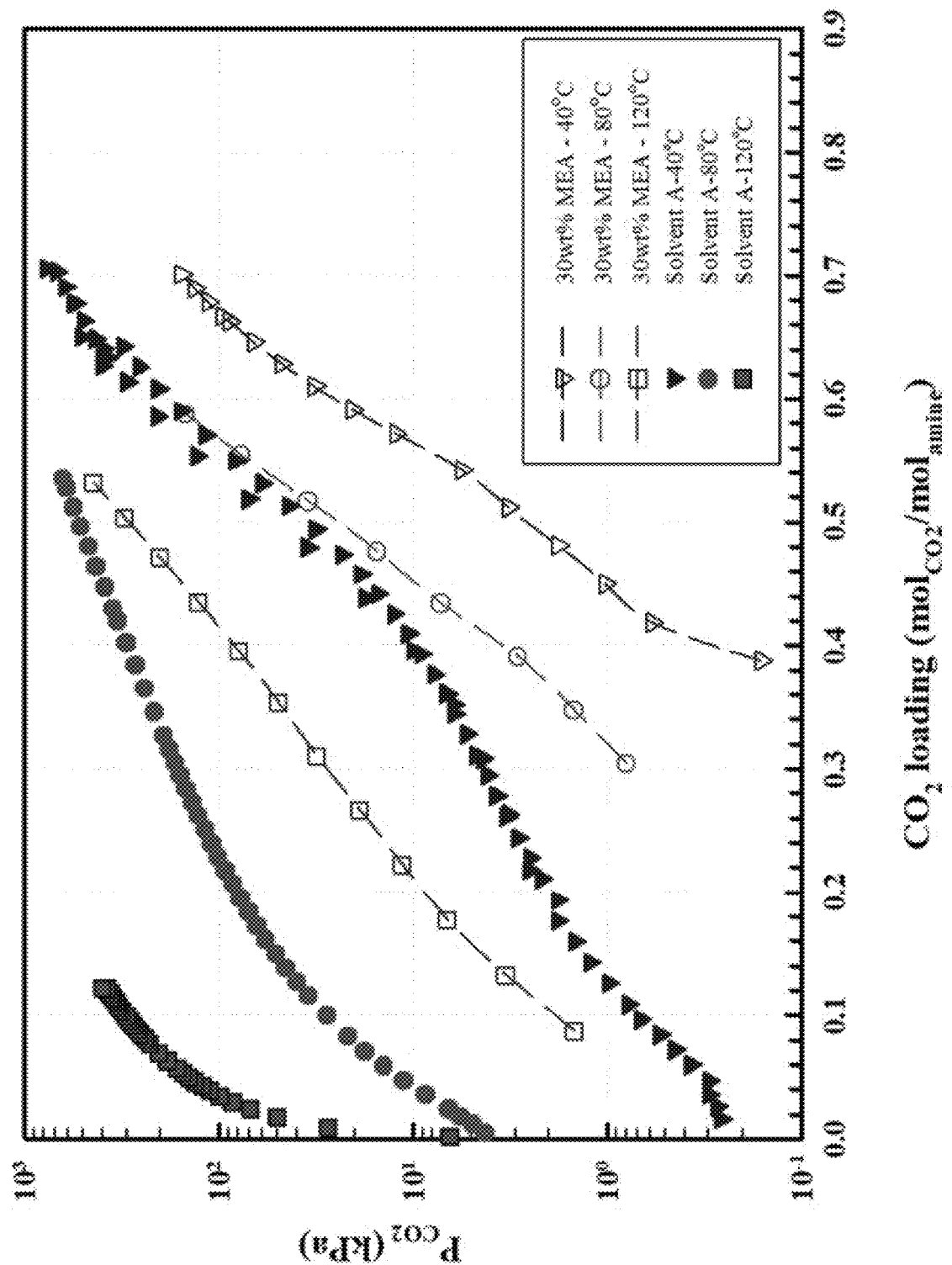

Having thus described the disclosure in the foregoing general terms, reference will now be made to the accompanying drawings, which are not necessarily drawn to scale, and wherein:

FIG. 1 is a diagram of a reboiler-based system according to certain embodiments of the present disclosure for the capture of acidic components from a mixed gas stream with a liquid solvent and regeneration of the liquid solvent;

FIG. 2 is a schematic perspective representation of a rotating packed bed (RPB) apparatus for gas-liquid contacting, according to certain embodiments of the present disclosure;

FIG. 3 is a graph of observed pseudo-first-order reaction rate constants for three different $CO_2$ capture solvents that can be used in certain embodiments of the present disclosure;

FIG. 4 is a graph of $CO_2$ recovery of various solvents tested within an example of a rotating packed bed (RPB) apparatus according to one embodiment of the disclosure; and FIG. 5 is a graph of the vapor-liquid equilibrium behavior of various solvents tested within an example of a rotating packed bed (RPB) apparatus according to one embodiment of the disclosure.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise.

As described hereinafter, the present disclosure relates to devices, systems, and methods for removal of acid gases from various gas streams (typically mixed gas streams). The terms "acid gas," "acid gas components," "acidic gas," and "acidic gas components" are intended to encompass gas components that can result in the formation of an acid when mixed with water.

Non-limiting examples of acid gases to which the disclosed devices, systems, and methods are applicable include carbon dioxide ($CO_2$), carbonyl sulfide (COS), carbon disulfide ($CS_2$), sulfur oxides ($SO_x$, e.g., $SO_2$), or any combination thereof.

In particular, the disclosure provides devices, systems, and methods employing rotating packed beds (RPBs) for acid gas removal from gas streams by gas-liquid mass transfer with non-aqueous solvents. By employing non-aqueous solvents for the gas-liquid contact within an RPB-based system, improvements in gas-liquid absorption, resulting in significantly reduced operating costs can be obtained in the context of acid gas removal as compared with aqueous solvent-containing RPB-based systems, as outlined herein below.

Solvent-based systems and processes for removal of acid gases, as provided herein, generally involve passing a gas stream to be treated through a liquid solvent; acidic gas components (e.g., $CO_2$ and other acid gases mentioned above) interact with the liquid solvent and the acidic gas components are thereby separated from the remainder of the gas stream. This interaction between the liquid solvent and the acidic gas components can be classified as physical adsorption (utilizing pressure for the dissolution of acidic components in the liquid solvent) and/or chemical absorption (forming chemical bonds between the acidic components and the liquid solvent).

The liquid solvent becomes rich in the acidic gas components, and the acidic gas components are typically removed to allow the liquid solvent to be recycled for further treatment of gas streams. For a liquid solvent that removes acidic components via physical absorption, removal of the gas components from a rich liquid solvent generally involves reducing the pressure of the liquid solvent. For a liquid solvent that removes acidic components via chemical absorption, removal of the gas components from a rich liquid solvent generally involves energy (e.g., heat) to reverse the reaction/break the chemical bonds formed between the liquid solvent and the acidic components.

An exemplary gas treatment system is illustrated in FIG. 1, wherein the system 10 comprises an absorber 12 (configured with a gas inlet to receive a gas stream to be treated, a solvent inlet to receive lean solvent influent, and gas and liquid outlets to remove treated gas and rich solvent effluent, respectively from the absorber) and an optional regenerator/desorber 14. This figure is intended to be exemplary in nature and the system provided herein can be arranged in an alternative manner and can include any number of additional (unpictured) components.

According to the present disclosure, the absorber 12 comprises a rotating packed bed (RPB), e.g., as schematically illustrated in FIG. 2. RPBs allow for a significant reduction in absorber size and cost as compared with conventional packed column-based systems. RPBs employ countercurrent gas-liquid scrubbing, but use centrifugal forces to increase the gas-liquid interfacial area.

Although the system 10 is illustrated as comprising a single RPB (12), it is noted that this depiction is not intended to be limiting. In some embodiments, two (or more) RPBs can be contained within the system, e.g., in series. For example, in some embodiments, the solvent is advantageously cooled between absorption stages and the gas and liquid countercurrently progress through the series of two or more RPBs. In one example embodiment, a gas travels through RPB 1, then 2, and so on; and a liquid travels in the other direction (e.g., from 2 to 1 in an example comprising two RPBs), going through heat exchanges in between. Such a system could comprise two (or more) completely separate RPBs or can comprise RPBs connected on the same shaft in separated stages.

RPBs and features thereof are generally known as described, for example, in U.S. Pat. No. 4,400,275 to Ramshaw et al.; U.S. Pat. No. 8,679,232 to Wolf et al.; and U.S. Pat. No. 9,987,589 to Kotagiri et al.; U.S. Patent Application Publication Nos. 2016/0243495 to Dutra et al. and 2020/0261846 to Mobley et al.; Wang et al., Ind. Eng. Chem. Res. 2008, 47, 8840-8846; Cortes Garcia et al., J. Chem. Tech. Biotech. 2017, 92(6), 1136-1156; Chamchan et al., J. Taiwan Inst. Chem. Eng. 2017, 73, 20-26; and Li et al., Chinese J. Chem. Eng. 2009, 17(3), which are incorporated herein by reference in their entireties. The exact type and configuration of the RPB employed according to the present disclosure is not particularly limited. For example, the direction of flow of the liquid and the gas to be treated with respect to one another can vary. In some embodiments, the RPB can be a cross-flow RPB; in some embodiments, the RPB can be a counter-flow RPB. Other configurations such as rotating zigzag beds (RZBs) are also known and can be employed as the RPB in the context of the present disclosure. The rotor design can vary widely, e.g., including different numbers of moving and/or stationary disks. Non-limiting examples of particular RPB designs that have been previously reported include, e.g., multi-stage spraying rotating packed bed, RPB with wave-form disk packing, helical rotating absorber, RPB with split packing, rotating zigzag bed (RZB), two-stage counter-current rotating packed bed, blade-packing rotating packed bed, counter-flow concentric ring rotating bed, and cross-flow concentric baffle rotating bed, as outlined in Cortes Garcia et al., J. Chem. Tech. Biotech 2017, 92(6), 1136-1156, which is incorporated herein by reference in its entirety. The RPB may comprise, in some embodiments, one or more intercoolers (e.g., applied to solvent between RPB stages) or one or more heating/cooling systems, which can be stationary and/or rotary and of different designs. In particular embodiments, a RPB with such a heating/cooling system as described in U.S. Patent Application Publication No. 2020/0261846 to Mobley et al., which is incorporated herein by reference in its entirety, can be employed.

As described herein, the use of non-aqueous solvents within RPBs leads to particularly advantageous results that have not been recognized previously. According to the present disclosure, a RPB is provided, wherein a non-aqueous liquid solvent is introduced through the liquid inlet of the RPB (see FIG. 2); a gas stream to be treated enters through the gas inlet of the RPB, shown, and acidic gas components within the gas stream to be treated can interact with the non-aqueous solvents within the RPB. The non-aqueous liquid solvent reacts with acidic gas components, capturing them from the remaining components of the gas stream. The capture can be based on chemical absorption and/or physical absorption. The non-aqueous liquid solvent advantageously provides a unique benefit within RPB-based systems, e.g., as the film thickness of the non-aqueous liquid solvent limits the mass-transfer rates in the bulk solvent. The non-aqueous liquid solvent in preferred embodiments is regenerable, i.e., captured acidic components can be released from the solvent and the solvent can then be reused to separate additional acidic components from further gas streams.

The solvent employed within the RPB according to the present disclosure can vary, although for purposes of the present disclosure, the solvent comprises (or consists essentially of) a non-aqueous solvent. A non-aqueous solvent is understood to be a liquid other than water, and is generally an organic solvent system that is miscible with low quantities of water (0 to about 20, 0 to about 10, and preferably less than about 10 weight/weight percent water). Non-aqueous solvents include both protic and aprotic solvents and combinations thereof. In some embodiments, the solvent contains about 18% water or less by weight, about 15% water or less by weight, about 12% water or less by weight, about 10% water or less by weight, or less than 10% water by weight (e.g., about 0% water to about 18% water, about 0% water to about 12% water, or about 0% water to about 8% water, about 0% water to about 9% water, about 0% water to about 10% water, e.g., about 2% water to about 18% water, about 2% water to about 15% water, about 2% water to about 12% water, about 2% water to about 10% water, about 2% water to about 9% water, or about 2% water to about 8% water).

Various types of suitable non-aqueous solvents, e.g., for the removal of acid gases from gas streams are described, for example, in International Patent Application Publication Nos. WO2012/031274 to Lail et al.; WO2012/031281 to Lail et al.; WO2013/130997 to Lail et al.; WO2015/123490 to Coleman et al.; U.S. Patent Application Publication Nos. 2009/0136402 and 2009/0220397 to Heldebrant et al.; U.S. Patent Application Publication No. US2020/0398216 to Rayer Rabindran et al.; International PCT Patent Application No. PCT/US2020/063892, filed Dec. 9, 2020; Lail et al., *Energy Procedia* 2014, 63, 580-594; Mobley et al., *Ind. Eng. Chem. Res.* 2017, 56(41), 11958-11966; Rayer et al., *Chem. Eng. J.* 2018, 348, 514-525; Zhou et al., RTI International and SINTEF: Trondheim, Norway, 2017 (available at https://www.sintef.no/globalassets/project/tccs-9/presentasjoner/a3/11---tccs-9---2017-06-12-nas-presentation-zhou.pdf); and Heldebrant et al., *Chem. Rev.* 2017, 117(114), 9594-9624, which are all incorporated herein by reference in their entireties.

In certain embodiments, the non-aqueous liquid solvent comprises a mixture of a chemical absorbent and a physical absorbent (e.g., a diluent), although it is not limited thereto (and can thus, in some embodiments, comprise only one or more physical absorbents or only one or more chemical absorbents). As such, in some embodiment, the non-aqueous liquid solvent includes anywhere from about 1 to 100% (neat) of the chemical absorption component relative to the total weight of the non-aqueous liquid solvent. Where a mixture of chemical and physical absorption components is provided, the components can be, in some embodiments, present in roughly equal proportions by weight percent. In some embodiments, the non-aqueous liquid solvent comprises up to about 70, 75, 80, or 90 weight percent (e.g., about 5 to about 30, about 10 to about 20, about 10 to about 80, about 10 to about 70, about 10 to about 60, about 20 to about 90, about 20 to about 80, about 20 to about 70, about 20 to about 60, about 20 to about 50, about 30 to about 90, about 30 to about 80, about 30 to about 70, or about 30 to about 60 weight percent) of the chemical absorption component relative to the total weight of the non-aqueous liquid solvent, with the remainder of the non-aqueous liquid solvent comprising, e.g., a physical absorption component and, in some embodiments, small amounts of water (e.g., about 10% by weight or less, about 8% by weight or less, or about 6% by weight or less) relative to the total weight of the non-aqueous liquid solvent. Examples of the types of physical absorbents and chemical absorbents that can be used as components of a non-aqueous liquid solvent as provided herein are outlined below.

The non-aqueous liquid solvent can comprise a chemical absorbent comprising one or more nitrogenous bases. In some embodiments, the nitrogenous base can have a pKa of about 8 to about 15, about 8 to about 14, about 8 to about 13, about 8 to about 12, about 8 to about 11, or about 8 to about 10. In certain embodiments, the nitrogenous base component has a pKa less than about 11.

In particular embodiments, the non-aqueous liquid solvent comprises a chemical absorbent comprising one or more amines, e.g., primary and/or secondary amines. A primary amine is understood to be a compound of the formula $NH_2R$, where R can be a carbon-containing group, including but not limited to $C_1$-$C_{20}$ alkyl. A secondary amine is understood to be a compound of the formula $NHR_1R_2$, wherein $R_1$ and $R_2$ are independently carbon-containing groups, including but not limited to $C_1$-$C_{20}$ alkyl. One or more of the hydrogens on R, $R_1$, and $R_2$ may optionally be replaced with one or more substituents. For example, one or more of the hydrogens on R, $R_1$, or $R_2$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl). Amines can be nucleophilic or non-nucleophilic.

In certain embodiments, primary or secondary amines may be selected from amines functionalized with fluorine-containing-alkyl-aromatic groups. In specific embodiments, the amine may be selected from the group consisting of 2-fluorophenethylamine, 3-fluorophenethylamine, 4-fluorophenethylamine, 2-fluoro-N-methylbenzylamine, 3-fluoro-N-methylbenzylamine, and 4-fluoro-N-methylbenzylamine, 2-fluorobenzylamine, 3-fluorobenzylamine, 4-fluorobenzylamine, 4,4,5,5,6,6,7,7,8,8,9,9,10,10,11,11,11-heptadecafluoroundecylamine, 2,3-difluorobenzylamine, 2,4-difluorobenzylamine, 2,6-difluorobenzylamine, 3,4-difluorobenzylamine 3,5-di-fluorobenzylamine, 2-trifluoromethylbenzylamine, 3-trifluoromethylbenzylamine, 4-trifluoromethylbenzylamine, D-4-fluoro-alpha-methylbenzylamine, and L-4-fluoro-alpha-methylbenzylamine. In some embodiments, a primary or secondary amine that is not fluorinated is employed as a chemical absorbent, e.g., including but not limited to, N-methyl benzylamine (MBZA), N-methyl naphthylamine, N-methyl-1-naphthalenemethyl amine, 1-(1-naphthyl)ethylamine, and combinations thereof.

In some embodiments, primary or secondary amines can comprise cyclic amines, diamines, primary and/or secondary alcoholamines. Cyclic amines are amines wherein the nitrogen atom forms part of the ring structure, and may include, but are not limited to, aziridines, azetidines, pyrrolidines, piperidines, piperazines, pyridines, and pyrimidines. Cyclic amines may comprise one or more rings and may optionally be substituted with one or more substituents as listed above. In some embodiments, the amine may be a diamine. In some embodiments, the amine may be a primary or secondary alcoholamine. Alcoholamines are also known as amino alcohols and contain both an alcohol and amine group. The amine group of the alcoholamine may be any type of amine as disclosed herein. Some amines (e.g., cyclic amines) are, in certain embodiments, functionalized with fluorine-containing groups.

Certain amines include, but are not limited to, 1,4-diazabicyclo-undec-7-ene ("DBU"); 1,4-diazabicyclo-2,2,2-octane; piperazine ("PZ"); triethylamine ("TEA"); 1,1,3,3-tetramethylguanidine ("TMG"); 1,8-diazabicycloundec-7-ene; monoethanolamine ("MEA"); diethylamine ("DEA"); ethylenediamine ("EDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethylamine; 3,5-difluorobenzylamine; 3-fluoro-N-methylbenzylamine; 4-fluoro-N-methylbenzylamine; imidazole; benzimidazole; N-methyl imidazole; 1-trifluoroacetylimidazole; 1,2,3-triazole; 1,2,4-triazole; and mixtures thereof.

In particular embodiments, the non-aqueous liquid solvent comprises a chemical absorbent comprising one or more amidines, guanidines, or tertiary amines, each of which can optionally be substituted (e.g., fluorinated).

Guanidines are understood to be compounds of the structure $RNC(NR_1R_2)_2$, wherein R, $R_1$, and $R_2$ are independently H or carbon-containing groups, including but not limited to $C_1$-$C_{20}$ alkyl. One or more of the hydrogen atoms on R, $R_1$, and/or $R_2$ may optionally be replaced with one or more substituents. For example, one or more of the hydrogens on R, $R_1$, $R_2$, and $R_3$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

Amidines include, but are not limited to a carboxamidine/carboximidamide, which is understood to be a compound of the structure $RC(=NH)NR_1R_2$, wherein R, $R_1$, and $R_2$ are independently H or carbon-containing groups, including but not limited to $C_1$-$C_{20}$ alkyl. One or more of the hydrogen atoms on R, $R_1$, and/or $R_2$ may optionally be replaced with one or more substituents. For example, one or more of the hydrogens on R, $R_1$, $R_2$, and $R_3$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

Exemplary guanidines and amidines include, but are not limited to, 1,1,3,3-tetramethylguanidine ("TMG"); N-tert-butyl-1,1,3,3-tetramethylguanidine, diphenylguanidine, ditolylguanidine, 1,8-diazabicyclo(5.4.0)undec-7-ene, 1,1,3-trimethyl-3-(2,2,3,3-tetrafluoropropyl)guanidine; 1,1,3-trimethyl-3-(2,2,3,3,3-pentafluoropropyl)guanidine; 1,3-dimethyl-1,3-bis(2,2,2-trifluoroethyl)guanidine; 1,3-bis(2,2,3,3-tetrafluoropropyl)guanidine; 1,3-bis(4-fluorophenyl)guanidine; 1,3-bis(3-fluorophenyl)guanidine; 1,3-bis(2-fluorophenyl)guanidine; 2-(2,2,2-trifluoroethyl)-1,4,5,6,-tetrahydropyrimidine; 2-(2,2,3,3-tetrafluoropropyl)-1,4,5,6,-tetrahydropyrimidine; 3,3,4,4-tetrafluoro-N,N-dimethylbutanimidamide; 3,3,3-trifluoro-N,N-dimethylpropanimidamide; and mixtures thereof.

A tertiary amine is understood to be a compound of the formula $NR_1R_2R_3$, wherein $R_1$, $R_2$, and $R_3$ are independently carbon-containing groups, including but not limited to $C_1$-$C_{20}$ alkyl. One or more of the hydrogens on R, $R_1$, $R_2$, and $R_3$ may optionally be replaced with one or more substituents. For example, one or more of the hydrogens on R, $R_1$, $R_2$, and $R_3$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

In some embodiments, the non-aqueous liquid solvent comprises a physical absorbent comprising a non-aqueous diluent. The diluent generally does not participate in reaction with the acidic gas (e.g., $CO_2$) to be removed from a gas stream. In certain embodiments, the diluent is selected such that it has low miscibility with water. Some non-aqueous diluents can be relatively acidic (having an acidity that is greater than the acidity of water, preferably substantially greater than the acidity of water, e.g., with a pKa of less than about 15, less than about 14, less than about 13, less than about 12, less than about 11, or less than about 10, such as about 6 to about 15, about 7 to about 15, about 8 to about 15, about 9 to about 15, about 6 to about 14, about 7 to about 14, about 8 to about 13, about 9 to about 13, about 6 to about 12, about 7 to about 12, about 8 to about 12, about 9 to about 12, about 6 to about 11, about 7 to about 11, about 8 to about 11, about 9 to about 11, about 6 to about 10, about 7 to about 10, or about 8 to about 10). Some non-aqueous diluents are not relatively acidic components, and do not have a pKa that falls within the ranges noted above. For example, a non-aqueous diluent may, in certain embodiments, have a pKa greater than about 15.

Exemplary classes of relatively acidic diluents that may be used according to the disclosure include, but are not limited to the following: fluorinated alcohols; optionally substituted phenols; and nitrogen heterocycles. Fluorinated alcohols useful according to the invention may comprise any compound having the formula R—OH, where R is an alkyl group (e.g., $C_1$-$C_{10}$ alkyl, $C_1$-$C_8$ alkyl, $C_1$-$C_6$ alkyl, $C_2$-$C_{10}$ alkyl, $C_2$-$C_8$ alkyl, $C_2$-$C_6$ alkyl, $C_3$-$C_{10}$ alkyl, $C_3$-$C_5$ alkyl, or $C_3$-$C_6$ alkyl) and wherein one or more hydrogen atoms of the alkyl group is substituted with fluorine. In some embodiments, the number of hydrogen atoms replaced with fluorine can be two, three, four, five, six, seven, eight, nine, or even more as may be deemed useful. In further embodiments, one or more of the hydrogen atoms of the alkyl group may optionally be replaced with one or more other substituents, including, but not limited to, $C_1$-$C_6$ alkyl, $C_1$-$C_6$ alkoxy, and halo substituents. Optionally substituted phenols useful in the context of the present disclosure are understood to be phenols wherein one or more of the hydrogen atoms on the phenyl ring may be replaced with a substituent. Non-limiting, exemplary replacement groups for one or more of the hydrogen atoms on the phenyl ring include $C_1$-$C_6$ alkyl, $C_1$-$C_6$ alkoxy, and halo. Nitrogen heterocycles are understood to be any cyclic compounds including at least one nitrogen atom in the ring structure (including, but not limited to, imidazoles, pyrazoles, and triazoles) and being optionally substituted such that one or more of the hydrogen atoms on the ring structure may be replaced with a substituent. Non-limiting, exemplary replacement groups for one or more of the hydrogen atoms on the ring include $C_1$-$C_6$ alkyl, $C_1$-$C_6$ alkoxy, and halo substituents.

In some specific embodiments, a diluent (e.g., relatively acidic diluent) may be selected from the group consisting of: 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7,7-nonafluoroheptanol; 1,1,3,3-hexafluoro-2-phenyl-2-propanol, 4-methoxyphenol ("4-MeOPh"); 4-ethoxyphenol ("4-EtOPh"); 2-ethoxyphenol; 4-propoxyphenol; imidazole; benzimidazole; N-methyl imidazole; 1-trifluoroacetylimidazole; 1,2,3-triazole; 1,2,4-triazole; 2-trifluoromethylpyrazole; 3,5-bistrifluoromethylpyrazole; 3-trifluoromethylpyrazole; and mixtures thereof.

In certain embodiments, a diluent may be generally selected from the group consisting of alcohols, ketones, aliphatic hydrocarbons, aromatic hydrocarbons, nitrogen heterocycles, oxygen heterocycles, aliphatic ethers, cyclic ethers, esters, and amides and mixtures thereof (all of which can be optionally substituted). In some embodiments, a diluent may be selected from the group consisting of fluorinated alcohols, fluorinated ketones, fluorinated aliphatic hydrocarbons, fluorinated aromatic hydrocarbons, fluorinated nitrogen heterocycles, fluorinated oxygen heterocycles, fluorinated aliphatic ethers, fluorinated cyclic ethers, fluorinated esters, and fluorinated amides and mixtures thereof. In specific embodiments the diluent may be selected from the group consisting of toluene, p-xylene, 1-methylnaphthalene, 2,4,6-dimethylaminophenol, benzylalcohol, 2,6-dimethylcyclohexanone, 3,5-lutidine, cyclohexanone, aniline, pyridine, 2-fluoroacetylphenone, 1-fluorodecane, 2,4-difluorobenzophenone, 2-fluoro-3-trifluoromethylaniline, 2-fluoroaniline, 4-fluoroaniline, 3-trifluoromethylacetophenone, 2-trifluoromethylacetophenone, bis(2,2,2-trifluoroethyl)methylphosphonate, 4-fluoro-3-(trifluoromethyl) benzaldehyde and mixtures thereof.

In some embodiments the non-aqueous liquid solvent may be in the form of an ionic liquid which can either physically adsorb or chemically absorb acidic gas components, e.g., carbon dioxide. In particular, hydrophobic viscous ionic liquids which are too viscous for use in flowing conventional column packing may be used as the non-aqueous solvent in certain embodiments of the present disclosure.

In one particular embodiment, a non-aqueous liquid solvent for use in the disclosed apparatus, system, and methods comprises a mixture of an amine (e.g., a hydrophobic amine) and a substituted or unsubstituted alkyl ether. For example, it may comprise a mixture of a secondary amine (e.g., a hydrophobic secondary amine) and a substituted or unsubstituted alkyl ether, such as a polyglycol dibutyl ether (e.g., di-ethylene glycol dibutyl ether, tri-ethylene glycol dibutyl ether, tetra-ethylene glycol dibutyl ether, or any combination thereof). In some embodiments, it may employ a mixture of a primary or secondary amine (e.g., a hydrophobic primary or secondary amine) and a fluorinated alcohol, e.g., OFP, TFP, PFP, or HFB. In some embodiments, it may employ a mixture of a primary or secondary amine (e.g., a hydrophobic primary or secondary amine) and an aliphatic hydrocarbon. In some embodiments, it may employ a mixture of an optionally substituted amidine or guanidine and a substituted or unsubstituted alkyl ether. Other combinations of the components outlined herein above not specifically mentioned in combination are intended to be encompassed herein in various embodiments as well.

In some embodiments, the non-aqueous liquid solvent described herein is substantially immiscible with water, having a solubility at 25° C. of less than or equal to about 25 g of solvent per 100 mL of water, less than about 20 g of solvent per 100 mL of water, less than or equal to about 10 g of solvent/100 mL of water, less than or equal to about 9 g of solvent/100 mL of water, less than or equal to about 8 g of solvent/100 mL of water, less than or equal to about 7 g of solvent/100 mL of water, less than or equal to about 6 g of solvent/100 mL of water, less than or equal to about 5 g of solvent/100 mL of water, less than or equal to about 4 g of solvent/100 mL of water, less than or equal to about 3 g of solvent/100 mL of water, less than or equal to about 2 g of solvent/100 mL of water, less than or equal to about 1 g of solvent/100 mL of water, less than or equal to about 0.5 g of solvent/100 mL of water, less than or equal to about 0.1 g/100 mL of water, or less than or equal to about 0.01 g/100 mL of water. In some embodiments, the solvent system is completely immiscible with water. Solvent systems with low water miscibility may, in some embodiments, display one or more of the following attributes: they may require less energy for regeneration; may have high $CO_2$ loading capacities; may be able to tolerate water in the gas stream; and/or may be able to be separated from water without a large energy penalty. It is noted that although solvent system components having low miscibility with water are preferred, the present disclosure also encompasses solvent systems wherein one or more of the components of the solvent system are at least partially miscible with water.

In some embodiments, any of the non-aqueous solvents described herein is tolerant to the presence of water. In certain embodiments, the solvent system tolerates water up to or equal to about 30% water by volume. For example, in some embodiments, the solvent system tolerates up to or equal to about 25% water by volume, up to or equal to about 20%, up to or equal to about 15%, up to or equal to about 10%, up to or equal to about 5%, up to or equal to about 2%, or up to or equal to about 1% water by volume. In some embodiments, tolerance to the presence of water means that there is little to no degradation of the solvent performance up to the indicated volume of water. In some embodiments, the non-aqueous liquid solvent maintains at or near its initial capacity for $CO_2$ loading up to the indicated volume of water. In some embodiments, the non-aqueous liquid solvent has a specific heat capacity less than 3.5 Joules/gram ° C.

In some embodiments, the non-aqueous liquid solvent may further comprise one or more additional components. The additional components may be added, for example, to increase the solubility of the captured $CO_2$ product in the solvent system, and thus avoid the formation of precipitates. In other embodiments, however, solids formation may be desirable, and such formation may be enhanced by altering the concentration of one or more solvent system components.

The gas stream treated according to the disclosed apparatus, system, and methods can vary but is generally an exhaust gas that is desirably treated before further use and/or release into the atmosphere. The origin of the gas stream treated by means of the disclosed apparatus, system, and/or method is not particularly limited and can generally be any gas stream that is desirably subjected to treatment to remove one or more components therefrom (e.g., treatment with a solvent to "scrub" the gas stream of one or more undesirable components). In one embodiment, the exhaust gas is a post-combustion gas stream (referred to herein also as a "flue gas" stream), e.g., originating from the combustion of fossil fuels such as coal, oil, or natural gas. Flue gas sources can be, e.g., from electricity generating units or industrial sites including coal, natural gas, biogas, and biomass combustion, cement, iron, steel, and waste-to-energy plant operations. It is generally known that such gas streams comprise acid gas components such as carbon dioxide ($CO_2$) and, due to the environmental impact and increasing regulations on emissions of such acid gases, such post-combustion gas streams are typically treated to decrease the acid gas content thereof. It is to be understood that the devices, systems, and methods provided herein can be adapted accordingly for the removal of any one or more contaminants as applicable to the particular source of the gas stream, so long as the general principles outlined herein are employed (e.g., the gas stream is contacted with a non-aqueous liquid solvent within an RPB for the removal of one or more components therefrom).

The temperature and pressure within the RPB may also be controlled. RPBs can be operated at a range of temperatures and pressures that are applicable to the disclosed apparatus, systems, and methods. For example, in one embodiment, the temperature of the absorber may be maintained at about 20° C. to about 70° C., e.g., about 30° C. to about 60° C., or about 40° C. to about 50° C., and the RPB can be held at a single temperature during use or can be varied. As such, in some embodiments, the RPB is equipped with a heating and/or cooling system, as referenced herein above, such that the operating temperature can be adjusted as desired. The RPB is typically operated at atmospheric pressure but can, in some embodiments, be operated at a pressure greater than atmospheric pressure. Furthermore, the rotational speed at which the RPB is operated can vary and may be modified to obtain suitable gas component removal from the gas stream. The liquid flow rate and the gas flow rate can be varied in some embodiments. Liquid to gas mass ratios can be about 0.5 to about 8 kg/kg. Specific examples of liquid to gas mass ratios include, but are not limited to, rates of about 0.83, about 1.67, about 2.5, about 3.33, about 0.49, about 0.98, about 1.46, and about 1.95, as well as all ranges therebetween.

At any stage in the process of $CO_2$ capture, the non-aqueous liquid solvent may be regenerated. As increasing amounts of the gas stream are treated within the RPB, the composition of the solvent within the unit can change. In particular, as the non-aqueous liquid solvent reacts with acidic gas components in the gas stream, reaction products are formed. Further, flue gases typically contain some water content; as such, water can, in some embodiments, accumulate within the RPB. In addition, reaction between other components of the gas and the solvent system can, in some embodiments, result in the production of additional species.

The gas treatment system includes an optional regeneration system 14 to release the captured $CO_2$ via a separate $CO_2$ gas stream and thus regenerate the solvent system. The regeneration system is configured to receive a feed of "rich" solvent from the RPB and to return regenerated solvent to the RPB once $CO_2$ has been separated from the "rich" solvent. The regeneration system may simply comprise a chamber with a heating unit to heat the solvent system at a temperature sufficient to release the gas, along with a release valve to allow the $CO_2$ to be removed from the regeneration system. It may be, in some embodiment, a distillation column; in further embodiments, the regeneration system can comprise a further RPB. In embodiments wherein the regeneration system comprises an RPB, the system is typically equipped with a heater applied to the solvent before it is introduced into the regeneration RPB or the system is set up with a reboiler configuration (e.g., where steam is produced in a reboiler and is the gas inlet to the regeneration RPB). The temperature of operation of an RPB employed for regeneration is generally considerably higher than the temperatures referenced herein above for the absorber RPB, as would be recognized by one of skill in the art.

The regenerator may be optionally connected to one or more components. For example, the regenerator is preferably configured with a means for routing solvent to a unit wherein water may be decanted, centrifuged, or otherwise removed from the system. The released $CO_2$ can be separated/withdrawn from the system and output to storage or for other predetermined uses. The regenerated solvent system is again ready to absorb $CO_2$ from a gas stream, and may be directed back into the RPB. It will be appreciated that any of the liquid and/or gas streams associated with the rotating packed bed apparatus or assemblies of multiple such apparatus may be heated or cooled in a heat exchanger with heating or cooling fluid from any suitable source.

In some embodiments, the performance of a solvent within an RPB can be described by its overall volumetric gas-phase mass transfer coefficient (KGa) is a representative metric of solvent performance in an RPB. Further detail on experimental determination and calculation of KGa is provided in the examples below. In some embodiments, the performance of non-aqueous solvents within an RPB as provided herein, based on corresponding KGa value is significantly greater than that of other solvents previously studied within RPBs. For example, in some embodiments, the KGa of the disclosed systems is about 4 or greater, about 4.2 or greater, about 4.25 or greater, about 4.3 or greater, about 4.4 or greater, about 4.5 or greater, or about 5 or greater (e.g., in the range of about 4 to about 7, about 4.2 to about 7, about 4.25 to about 7, about 4.5 to about 7, or about 5 to about 7), e.g., for an L/G ratio above 0.45 kg/kg.

The present disclosure encompasses an RPB apparatus (e.g., as schematically illustrated in FIG. 2), a gas treatment system comprising such an RPB apparatus (e.g., as schematically illustrated in FIG. 1), and an associated method of use. As such, the disclosure includes a method of treating a gas stream to remove an acid gas component therefrom, wherein various parameters and features of the method can be modified consistent with the system disclosure provided herein above.

The devices, methods, and systems outlined herein provide various advantages over known devices, methods and systems. Use of the non-aqueous solvents described herein in RPBs uniquely and surprisingly provides for significantly improved acid gas component removal as compared with known aqueous solvents for acid gas removal, e.g., aqueous solutions of monoethylamine (MEA) under comparable conditions. In particular, as demonstrated in the experimental section herein below, the absorption kinetics of a non-aqueous liquid solvent within an RPB are higher than those of a comparative aqueous monoethylamine (MEA) solution. This finding was unexpected and demonstrates that non-aqueous solvents are uniquely suited for use in an RPB. In Rayer et al., Chem. Eng. J. 2018, 348, 514-525 (which is incorporated herein by reference in its entirety), it was shown that non-aqueous solvents had kinetic rates approximately one order of magnitude lower than aqueous MEA (see FIG. 11 in Rayer et al.).

FIG. 3 of the present application shows the observed pseudo-first-order reaction rate constant for aqueous MEA compared to two solvents with MBZA as the amine component. One solvent is aqueous (MBZA/$H_2O$) and the other is a non-aqueous solvent with the primary diluent as triethylene glycol dibutyl ether and a small amount of water (<10 wt %). The non-aqueous solvent is shown to have an observed pseudo-first-order reaction rate constant much lower than MEA, but the same amine in an aqueous solvent had a reaction rate constant approximately three times faster than aqueous MEA. The benefits of a non-aqueous solvent would be reduced by requiring water as a diluent to attain fast kinetics because the energy penalty would be raised by a higher specific heat and a higher water vapor pressure. It is believed that the low conductivity and film thickness of the non-aqueous solvents limits the mass transfer rates in the bulk solvent. As with conventional packed absorbers, RPBs allow for countercurrent gas-liquid scrubbing, but they use centrifugal forces to significantly increase the gas-liquid interfacial area with thin films and can shift processes from mass-transfer limited to kinetically limited. The experimental section herein below demonstrates that non-aqueous solvents can react at kinetic rates much faster than aqueous MEA in an RPB without requiring an aqueous diluent, believed to result from the thin films in the RPB. Certain embodiments of the disclosure are capable of performing high levels of $CO_2$ removal similar to (or better than) aqueous MEA solutions, and are capable of providing for significant cost benefits as well, as described in further detail herein below.

For example, by employing a non-aqueous solvent-based RPB as the absorber within a gas treatment system, the absorber size can be reduced as compared with existing technology (e.g., as compared with systems comprising conventional packed column absorbers). In some embodiments, acid gas removal comparable to (or better than) that of a conventional packed column absorber-based system can be obtained using a RPB absorber-based system as provided herein, wherein the RPB is at least about 5× smaller than the conventional packed column, at least about 8× smaller than the conventional packed column, at least about 10× smaller than the conventional packed column, at least about 15× smaller than the conventional packed column, or at least about 20× smaller than the conventional packed column. By reducing the size of the absorber, associated reductions in the overall spatial footprint of an acidic gas component capture system can be obtained. Such advantages are particularly advantageous for application in sites with physical limitations of limited space.

By employing a non-aqueous solvent-based RPB as the absorber within a gas treatment system, various costs can also be reduced as compared with existing technology. The smaller size of an RPB as compared with a conventional packed column-based absorber can provide reductions in capital/equipment costs (CAPEX) as compared with those of the conventional packed column-based absorber. For example, use of a non-aqueous solvent-based RPB as provided herein can provide for a decrease in absorber CAPEX of more than 90% as compared with a conventional packed column-based absorber. The non-aqueous solvent-based RPB also can provide reduced operating costs for acid gas removal. Based on a decrease in absorber CAPEX of more than 90%, the overall cost of acid gas capture for the system can be reduced by about 25% compared to conventional equipment with the non-aqueous solvent at a 275 t-$CO_2$/day scale. Further, based on modeling estimates, the use of a non-aqueous liquid solvent in RPB-containing systems can provide a lower reboiler duty than associated with MEA (e.g., including, but not limited to, in the context of treating cement flue gas).

In certain embodiments, use of the types of devices, methods, and systems provided herein can lead to downstream advantages. For example, the lowered costs associated with acid gas capture as provided herein can lead to the applicability of the captured acid gas for commercial applications. As such, in some embodiments, the disclosed methods can further comprise isolating the captured acid components following treatment as described herein for use, e.g., in enhanced oil recovery, producing chemicals, and various other processes employing acid components such as $CO_2$.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

EXPERIMENTAL

Aspects of the present disclosure more fully illustrated by the following example, which is set forth to illustrate certain aspects of the present invention and is not to be construed as limiting thereof.

A non-aqueous solution (referred to herein as "Solvent A") was provided, containing about 50-55% amine (MBZA), with the remainder being a polyethylene glycol alkyl ether diluent and water. Solvent A contained less than 10 weight percent water and included no activators. Solvent A was evaluated as a solvent within an RPB using a rotating packed bed-containing system, with the rotating packed bed installed on a vertical axle (with the rotor placed inside a plexiglass tube, allowing for visual observation). The rotor packing was driven by an electric motor and a rotating dry de-mister was installed on the same axle above the active rotor to prevent droplets from following the gas out. Two $CO_2$ analyzers were installed before and after the rotor packing to identify the $CO_2$ recovery and a fourier transform infrared (FTIR) detector was installed in the outlet to enable analysis of the emissions from the system to the atmosphere.

Solvent (Solvent A) was preheated in a lean tank to a desired temperature (e.g., 40° C.) and then fed through the rotating axle. The solvent flows radially while the gas to be treated moves axially upward, and the solvent is eventually routed to a receiving tank. The air is heated by an electric heater and supplied to the rotating packing bed by a fan; $CO_2$ was introduced into the inlet directly to mix with the air to produce "artificial flue gas," with about 1 mol % $CO_2$ concentration.

The following parameters were set for the tests:
Liquid Flow (L)=5, 10, 15, and 20 kg/min
Gas Flow (G)=6 and 10 kg/min
Initial $CO_2$ loading ($\alpha$)=0.115 mol-$CO_2$/mol-amine
Rotational Speed ($\omega$)=820 rpm
Temperature of gas ($T_{gas}$)=40° C.
Temperature of liquid ($T_{liq}$)=40° C.
$CO_2$ in inlet gas≈1 mol %

Solvent A was tested within the RPB system to evaluate the $CO_2$ recovery, based on previous $CO_2$ capture tests with coal flue gas in which typical lean loading was found to be about 0.115 mol/mol (which can be compared with the typical lean loading of MEA aqueous solutions (about 0.2 mol/mol)). Similar test conditions in another cross-flow RPB with $CO_2$ in the inlet gas of 1 mol % and a rotational speed of 900 rpm with three different solvents were reported in Lin and Chen, *Chemical Engineering Research and Design* 89 (2011) 1722-1729, which is incorporated herein by reference in its entirety. To compare the experimental performance of Solvent A with other solvents from literature, the experimental overall volumetric gas-phase mass transfer coefficient (KGa) is a representative metric of solvent performance in an RPB. KGa is defined in Lin and Chen as:

$$K_G a = \frac{Q_G}{\pi(R_o^2 - R_i^2)Z_B} \ln\left(\frac{C_i}{C_o}\right)$$

where $Q_G$ is the volumetric flow rate of gas, $Z_B$ is the axial length of the cross-flow RPB, and $R_i$ and $R_o$ are the inner and outer radii of the cross-flow RPB, respectively. $C_i$ and $C_o$ are the concentrations of $CO_2$ in the inlet and outlet gas streams. Comparisons of the $K_{Ga}$ with these various solvents as a function of liquid to gas flow rate ratio are shown in FIG. 4 (open markers are from Lin and Chen, closed symbols are Solvent A tests, open circles are MEA, open diamonds are NaOH, and open squares are AMP). See also Lin and Chen, *Chem. Eng. Res. Des.*, 89(9), September 2011, pages 1722-1729, which is incorporated herein by reference in its entirety. It can be seen from FIG. 4 that the experimental KGa of Solvent A (0.115 mol/mol) increases logarithmically with increasing L/G, which agrees with the trend of the other solvents. A trendline for the KGa for Solvent A is 1.658ln (L/G)+5.905 with an $R^2$ of 0.95.

The KGa of Solvent A (0.115 mol/mol) was found to be higher than the other solvents at similar operating conditions. This result is of higher significance when considering that these tests were conducted at 1 vol % $CO_2$, which is approximately the Solvent A equilibrium rich loading at a partial pressure of 1 kPa (FIG. 5), yet the equilibrium rich loading for MEA is ~0.45 mol/mol. However, the application of Solvent A in such cases would simply need a shifted $CO_2$ loading working range. The rich loading of about 0.12 mol $CO_2$/mol amine at 1 vol % would require a lean loading close to 0 mol $CO_2$/mol amine, which is possible with 120° C. regeneration. By contrast, the high absorption rate shown with a starting $CO_2$ loading of 0.115 mol $CO_2$/mol amine indicates that Solvent A retains very fast kinetics while approaching the vapor-liquid equilibrium, as shown in FIG. 5. Lin and Chen do not include the $CO_2$ loading of the solvents tested, but it is likely that they are fresh solvents with 0 mol/mol $CO_2$ loading. For example, the average increase of KGa of Solvent A is about 500% more than 1 mol/L MEA aqueous solution at L/G ratio ~2.5 kg/kg conditions (6.98 vs 1.16 1/s—representing a very significant increase), as shown below in Table 1. The very high KGa indicates that the non-aqueous solvent in an RPB has very fast kinetics and can efficiently remove acid gas components from a gas stream in a much smaller RPB than aqueous MEA, reducing the capital costs of the equipment significantly.

TABLE 1

Experimental overall volumetric gas-phase mass transfer coefficients of Solvent A at different liquid and gas flow rates.

| L (kg/min) | G (kg/min) | L/G (kg/kg) | $K_G$a (l/s) |
|---|---|---|---|
| 4.75 | 6.07 | 0.78 | 5.80 |
| 10.75 | 6.07 | 1.77 | 6.88 |
| 15.57 | 5.98 | 2.60 | 6.98 |
| 20.38 | 5.95 | 3.43 | 8.03 |
| 10.75 | 10.12 | 1.06 | 5.99 |
| 4.75 | 10.08 | 0.47 | 4.60 |
| 4.75 | 10.12 | 0.47 | 4.54 |
| 10.75 | 10.05 | 1.07 | 5.77 |
| 15.57 | 10.00 | 1.56 | 6.86 |
| 15.57 | 9.63 | 1.62 | 6.66 |
| 20.38 | 10.17 | 2.00 | 7.42 |

What is claimed is:

1. An apparatus for removal of one or more acid gas components from a gas stream, comprising a rotating packed bed (RPB) arranged on a rotatable shaft, the RPB comprising:
   a gas inlet through which an influent gas can enter for gas-liquid contact;
   a gas outlet through which an effluent gas can exit following the gas-liquid contact;
   a liquid inlet through which a liquid can enter for the gas-liquid contact;
   a liquid outlet through which the liquid can exit following the gas-liquid contact; and
   a conduit between the liquid inlet and the liquid outlet, the conduit comprising a non-aqueous liquid solvent for the gas-liquid contact contained therein,
   wherein the non-aqueous liquid solvent contains about 18% water or less by weight, and wherein the non-aqueous liquid solvent has a solubility with water of less than about 25 g of water per 100 g of the non-aqueous liquid solvent, wherein the non-aqueous liquid solvent removes the one or more acid gas components via chemical absorption, and wherein the non-aqueous liquid solvent comprises a hydrophobic primary or secondary amine and a diluent comprising an aliphatic ether.

2. The apparatus of claim 1, wherein the non-aqueous liquid solvent is a solvent for acid gas removal from a flue gas stream.

3. The apparatus of claim 1, wherein the non-aqueous liquid solvent contains less than 10% water by weight.

4. The apparatus of claim 1, wherein the non-aqueous liquid solvent has a kGa value of about 4.5 or greater for an L/G ratio above 0.45 kg/kg.

5. The apparatus of claim 1, wherein the non-aqueous liquid solvent comprises a physical absorbent and a chemical absorbent.

6. The apparatus of claim 1, wherein the RPB is equipped with a cooling mechanism.

7. The apparatus of claim 6, further comprising a second RPB.

8. A system for the removal of one or more acid gas components from a gas stream, comprising the apparatus of claim 1.

9. The system of claim 8, further comprising a regenerator in fluid communication with the liquid outlet.

10. The system of claim 8, wherein the regenerator comprises a second RPB.

11. A method for treating a gas stream to remove one or more acid gas components therefrom, comprising passing the gas stream into the gas inlet of the apparatus of claim 1.

12. The method of claim 11, wherein the gas stream is a flue gas stream.

13. The method of claim 11, wherein the one or more acid gas components comprises $CO_2$.

14. The method of claim 11, further comprising regenerating the non-aqueous liquid solvent to remove the acid gas components therefrom.

15. A method of reducing capital and operating expenses associated with a system designed for capture of acid gas components from a gas stream, comprising employing the apparatus of claim 1 within the system in place of a conventional packed column bed absorber apparatus.

16. The system of claim 1, wherein the non-aqueous liquid solvent is not an ionic liquid.

* * * * *